United States Patent [19]

Smith et al.

[11] Patent Number: 5,166,326
[45] Date of Patent: Nov. 24, 1992

[54] POLYMERIZABLE METAL-AZO AND METAL-AZOMETHINE DYES

[75] Inventors: Terrance P. Smith; David W. Malcomber; Mohammed A. Elmastry, all of St. Paul, Minn.

[73] Assignee: Minnesota Mining and Manufacturing Company, St. Paul, Minn.

[21] Appl. No.: 667,658

[22] Filed: Mar. 11, 1991

[51] Int. Cl.⁵ .................. C09B 45/00; C08F 30/00
[52] U.S. Cl. .................................... 534/701; 526/241
[58] Field of Search ............ 534/713, 701, 702, 703; 8/647

[56] References Cited

U.S. PATENT DOCUMENTS

| | | | |
|---|---|---|---|
| 3,756,814 | 9/1973 | Bedell | 430/213 |
| 4,218,367 | 8/1980 | Brouard et al. | 534/625 |
| 4,605,607 | 8/1986 | Nikles et al. | 430/17 |

OTHER PUBLICATIONS

K. Gulbins and W. Schwindt, "A Noval Concept of Dye Application for Dyeing and Printing," *JSDC* Dec. 1965 pp. 579–583.

*Primary Examiner*—Joseph L. Schofer
*Assistant Examiner*—Wu C. Cheng
*Attorney, Agent, or Firm*—Gary L. Griswold; Walter N. Kirn; Gregory A. Evearitt

[57] ABSTRACT

Disclosed are metal-azo and metal-azomethine materials which are useful as monometric dyes which may be mordanted by polymerization. The inventive dyes contain a central metal; an azo containing ligand; and a ligand having a free-radically polymerizable group (not directly attached to the azo or azomethine containing ligand) bound to the metal, and optionally, a monodentate or bidentate ligand which satisfy the coordination requirements of the central metal. Also disclosed are homopolymers and copolymers of the metal-azo or metal azomethine dyes.

12 Claims, No Drawings

POLYMERIZABLE METAL-AZO AND METAL-AZOMETHINE DYES

FIELD OF THE INVENTION

This invention relates to metal complex dyes, and more particularly to transition metal complex dyes with pendant free-radically polymerizable groups.

BACKGROUND INFORMATION

Metal-azo and metal-azomethine dyes, having a single dye ligand complexed to a metal, are known in the art (see, for example, Drew, H. D. K.; Fairbairn, R. E. J. Chem. Soc. 1939, 823–35; Beech, W. F.; Drew, H. D. K. J. Chem. Soc. 1940, 608–12; Steiner, E.; Mayer, C.; Schetty, G. Helv. Chem. Acta 1976, 59, 364–76; U.S. Pat. Nos. 4,012,369; 4,123,429; and 4,265,811). These 1:1 complexes are predominantly used in two applications; color photography (U.S. Pat. Nos. 3,453,107; 3,551,406; 3,544,545; 3,563,739; 3,597,200; 3,705,184; 3,752,836; 3,970,616; 4,150,018; and 4,562,139), and the dyeing of textiles (U.S. Pat. Nos. 3,878,158; 4,045,423; 4,218,367; and 4,617,382; and European Pat. No. 144776). The 1:1 complexes have a central metal ion coordinated to a dye and additional ligands (e.g., water, pyridine, ammonia, or ethanolamine).

Metal complexes containing a polymerizable functionality are also known. For example metal-vinylpyridine complexes are known which are capable of polymerization (U.S. Pat. No. 3,287,455 and Agnew, N. H.; Collin, R. J.; Larkworthy, L. F. J. Chem. Soc. Dalton Trans. 1974, 272–7). Generally, the extinction coefficients of visible wavelength transitions in polymerizable metal complexes of the prior art are less than $1000 M^{-1} cm^{-1}$ which make them, in general, unsuitable as dyes or colorants.

Many transition metal complexes with vinylpyridine as a ligand are unstable. Some of these complexes are quite labile in solution, exhibiting the following equilibrium:

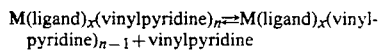

$$M(ligand)_x(vinylpyridine)_n \rightleftharpoons M(ligand)_x(vinylpyridine)_{n-1} + vinylpyridine$$

Additionally, transition metals, such as copper(II) and ruthenium(III), may initiate the polymerization of vinylpyridine (e.g., Tazuke, S.; Okamura, S. J. Polym. Sci.: Part A-1 1966, 4, 141–57; and Norton, K. A., Jr.; Hurst, J. K. J. Amer. Chem. Soc. 1978, 100, 7237–42), although some stable complexes of copper(II) and vinylpyridine have been reported (Laing, M.; Horsfield, E. J. Chem. Soc., Chem. Commun. 1968, 735).

Vinyl groups on ligands may undergo cyclometallation or coordinate to the metal, thereby rendering them non-polymerizable (Newkome, G. R.; Theriot, K. J.; Cheskin, B. K.; Evans, D. W.; Baker, G. R. Organometallics 1990, 9, 1375–9; and Long, C.; Kelly, J. M. J. Organometal. Chem. 1982, 231, C9).

Metal-containing polymerizable complexes which absorb light more strongly than the vinylpyridine complexes are also known in the art (Sheats, J. E.; Carraher, C. E., Jr.; Pittman, C. U., Jr. in Metal-containing Polymeric Systems; Plenum Press: New York, 1985). The most studied systems are vinylcyclopentadienyl complexes of low valent metals. These metal-containing monomers are usually very electron rich, and the polymeric material derived from these monomers are often easily oxidized.

It has been shown that (4-vinyl-4'-methyl-bipyridyl)-Re(CO)₃Cl undergoes chemical changes, under some conditions, when exposed to filtered sunlight (O'Toole, T. R.; Sullivan, B. P.; Meyer, T. J. J. Am. Chem. Soc. 1989, 111, 5699–706). The chemical and photochemical reactivities of these molecules suggest they would not be useful polymerizable dyes.

Advantages of metal-containing polymeric dyes have been taught in the art (Marechal, E. Progress in Organic Coatings 1982, 10, 251–87; and Asquith, R. S.; Blair, H. S.; Crangle, A. A.; Riordan, E. J. Soc. Dyers Colour. 1973, 93, 115). Most of these polymers involve colorants other than azo, hydrazone, or azomethine dyes and are derived from monomers not containing free-radically polymerizable groups.

U.S. Pat. No. 4,218,367 describes the preparation and use of 1:1 chromium metal-azo dyes containing reactive groups. In claim 5 of that patent, 1:1 complexes, where the reactive group is a vinyl sulfone directly bound to the azo ligand, are claimed. There are no examples given wherein a vinyl sulfone group was actually present. Dyes of that patent react with preformed polymers such as cellulose. There are no examples in that patent of forming polymers using dyes containing a vinyl sulfone group.

Poly(vinylpyridine) and copolymers containing vinylpyridine are used in mordanting receiving layers in photographic films (for example, U.S. Pat. No. 4,282,305). Unmetallized dyes diffuse to the receiving layer and form a metal complex which is presumably attached to poly(vinylpyridine). The ratio of dye to vinylpyridine is not controlled.

What the foregoing art does not disclose or teach is that metal-dye complexes having ligands with polymerizable groups may be conveniently made and polymerized to provide stable mordanted dyes.

SUMMARY OF THE INVENTION

This invention provides metal-containing polymerizable dyes. Metal-containing polymerizable dyes of the present invention have the following formula:

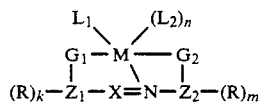

wherein:

$Z_1$ and $Z_2$ each independently represents an arene nucleus, wherein $Z_1$ and $Z_2$ have from 5 to 14 ring atoms;

$G_1$ and $G_2$ each independently represent a metal ligating group, wherein $G_1$ and $G_2$ may be contained within or pendant from at least one of $Z_1$ and $Z_2$;

R represents a hydrogen atom, a halogen atom, an alkyl group, an acylamino group, an alkoxy group, a sulfonamido group, an aryl group, a thiol group, an alkylthio group, an arylthio group, an alkylamino group, an arylamino group, an amino group, an alkoxycarbonyl group, an acyloxy group, a nitro group, a cyano group, a sulfonyl group, a sulfoxyl group, an aryloxy group, a hydroxy group, a thioamido group, a carbamoyl group, a sulfamoyl group, a carboxyl group, a sulfo group, a formyl group, an acyl group, a ureido group, or aryloxycarbonyl group, a silyl group, a carbonato group, or a sulfoalkoxy group;

$L_1$ represents any 1°, 2°, or 3° nitrogen or 1°, 2°, or 3° phosphorus containing group having a free-radically polymerizable group covalently bonded thereto;

$L_2$ represents a monodentate or polydentate (e.g. bidentate) ligand;

X represents nitrogen or a methine group;

M is a divalent or polyvalent transition metal ion where the coordination number is at least four; and k, m, and n are whole numbers less than or equal to 3.

The polymerizable metal-azo and metal-azomethine dyes of the present invention have a number of useful properties. To begin with, the inventive dyes have extinction coefficients generally greater than $1000 M^{-1} cm^{-1}$, often up to and exceeding $10,000 M^{-1} cm^{-1}$, which makes them very useful for dyeing synthetic polymers and resins. Additionally, they are surprisingly stable, many of them melting sharply at temperatures above 200° C. Also, the transition metals which are employed as the central atom in the metal-dye complexes of this invention do not ligate to the polymerizable functionality present in the dye, which, if it occurred, would prevent the polymerization of the dye.

Other aspects and advantages of the present invention are apparent from the detailed description, examples, and claims.

DETAILED DESCRIPTION OF THE INVENTION

Polymerizable metal-azo dyes of the present invention are represented by the following general structure:

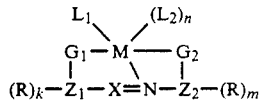

wherein:

$Z_1$ and $Z_2$ each independently represents an arene nucleus, wherein $Z_1$ and $Z_2$ have from 5 to 14 ring atoms; for example $Z_1$ and $Z_2$ may represent a heterocyclic or substituted heterocyclic nucleus (e.g., pyrrole, pyrazole, furan, indole, thiophene, etc.), or a carbocyclic or substituted carbocyclic aromatic nucleus (e.g., benzene, naphthalene, toluene etc.) As used herein, the term "arene nucleus" means a nucleus containing at least one aromatic ring, e.g. benzene or naphthalene.

$G_1$ and $G_2$ each independently represent a metal ligating group (e.g., oxygen, sulfur, amines, substituted amines, acylamido, sulfonamido), and further wherein $G_1$ and $G_2$ may be contained within or pendant from at least one of $Z_1$ and $Z_2$.

R represents a hydrogen atom, a halogen atom, an alkyl group (e.g., a methyl group, ethyl group, hexyl group, etc.), an acylamino group (e.g., an acetamido group, benzamido group, hexaneamido group, etc.), an alkoxy group (e.g., a methoxy group, ethoxy group, benzyloxy group, etc.), a sulfonamido group (e.g., a methanesulfonamido group, benzensulfonamido group, etc.), an aryl group (e.g., a phenyl group, a 4-chlorophenyl group, etc.), a thiol group, an alkylthio group (e.g., a methylthio, a butylthio group, etc.), an arylthio group (e.g., a phenylthio group, a 4-methoxyphenylthio group, etc.), an alkylamino group (e.g., a cyclohexylamino group, methylamino group, etc.), an arylamino group (e.g., an anilino group, a 4-methoxycarbonylamino group, a naphthylamino group, etc.), an amino group, an alkoxycarbonyl group (e.g., a methoxycarbonyl group, a butoxycarbonyl group, etc.), an acyloxy group (e.g., an acetoxy group, a butyryloxy group, a benzoyl group, etc.), a nitro group, a cyano group, a sulfonyl group (e.g., a butanesulfonyl group, a benzenesulfonyl group, etc.), a sulfonyl group (e.g., a butanesulfoxyl group, a benzenesulfoxyl group, etc.), an aryloxy group (e.g., a phenoxy group, a naphthyloxy group, etc.), a hydroxy group, a thioamido group (e.g., a butanethioamido group, a benzenethiocarbamoylamido group, etc.), a carbamoyl group (e.g., a carbamoyl group, an N-arylcarbamoyl group, an N-alkylcarbamoyl group, etc.), a sulfamoyl group, an N-arylsulfamoyl group, etc.), a carboxyl group, a sulfo group, a formyl group, an acyl group (e.g., an acetyl group, a hexanoyl group, a benzoyl group, etc.), an ureido group (e.g., an N-ethylureido group, etc.), an aryloxycarbonyl group (e.g., a phenoxycarbonyl group, a 4-methoxycarbonyl group, etc.), a silyl group (e.g., a trimethylsilyl group, a phenyldimethylsilyl group, etc.), a carbonato group (e.g., a methylcarbonato group, a phenylcarbonato group, etc.), a sulfoalkoxy group (e.g., a sulfomethoxy group, a sulfophenoxy group, etc.)

$L_1$ represents any primary (1°), secondary (2°), or tertiary (3°) nitrogen or any 1°, 2°, or 3° phosphorus containing group having a free-radically polymerizable group covalently bonded thereto. $L_1$ is bonded to M through a 1°, 2°, or 3° nitrogen or phosphorus atom. Suitable free-radically polymerizable groups are well known in the art and include, but are not limited to, 2° or 3° alkenyl including conjugated alkadienyl groups, preferably 2° or 3° alkenyl or conjugated alkadienyl groups having from 3 to 12 carbon atoms, e.g., a 2-methylpentenyl group, an isoprenyl group, a 2-methylhexenyl group, etc., or halogen substituted 1° alkenyl groups having from 2 to 14 carbon atoms wherein the halogen is bonded directly to the carbon-carbon double bond, e.g., a chlorethenyl group, a chlorophenyl group, etc.; styryl groups including p-substituted styryl groups, preferably having from 8 to 20 carbon atoms, e.g., a p-methoxystyryl group, a p-dodecylstyryl group, etc.; vinyl ester groups, preferably having from 4 to 16 carbon atoms, e.g., $-CH_2CO_2CH=CH_2$, $CH_3CH_2CO_2CH=CH-$, etc.; vinyl ether groups, preferably having from 3 to 15 carbon atoms, e.g., an ethenyloxymethyl group, an isopropenyloxyethyl group, etc.; an acrylate group; a methacrylate group; a cyanoethenyl group; a cyanoisopropenyl group; an acrylamido group, and a methacrylamido group. Preferably, $L_1$ is a nitrogen containing heterocycle which has a vinyl, acrylate, or methacrylate containing group as a substituent. It is particularly preferred that $L_1$ is a vinylpyridine, vinylimidazole, or vinylbipyridyl. Examples of $L_1$ include, but are not limited to, 2-vinylpyridine, 3-vinylpyridine, 4-vinylpyridine, 4-vinyl-2,2'-bipyridyl, 4-vinyl-4'-methyl-2,2'-bipyridyl, 2-(3-pentenyl)pyridine, 3-(3-pyridyl)propyl methacrylate, 1-vinylimidazole, etc.

$L_2$ represents a monodentate or polydentate (e.g. bidentate) ligand. Suitable monodentate ligands include water; ammonia; halides (e.g., fluorine, chlorine, etc.); thiocyanate; cyanide ($-1$); azide ($-1$); carbon monoxide; alkyl and aryl isocyanides (e.g., methylisocyanide, phenylisocyanide, etc.); alkyl and aryl nitriles (e.g., acetonitrile, benzonitrile, etc.); phosphines $PR^1{}_3$, amines $NR^1{}_3$, arsines $AsR^1{}_3$, sulfides $R^1SR^1$ (wherein each $R^1$ independently represents an alkyl or aryl group); heteroarenes (e.g., pyridine, quinoline, etc.); nitrate (−1); sulfate (−2). Suitable bidentate ligands include alkylene and arylenediamines (e.g., ethylenediamine, 1,2-benzenediamine, tetramethylethylenediamine; etc.); polycyclic arenes with two or more aromatic nitrogen atoms (e.g., bipyridyl, 1,10-phenanthroline, etc.); oxalate (−2); alkyldiketonates (e.g., acetylacetonate(−1), etc.); N,N-dialkyldithiocarbamates(−1); ethylenediamine; 8-hydroxyquinolate(−1); diarylgyloximates(−2).

X represents nitrogen or a methine (CH) group.

M is a divalent or polyvalent transition metal ion where the coordination number is at least four. Preferred metals are Group 6 and Group 11 metal ions. Particularly preferred metal ions are chromium (III), nickel(II), palladium (II), and platinum (II). The ratio of metal-to-dye in the present invention is 1:1.

k, m and n are whole numbered less than or equal to 3.

The metal chelate may be formed with loss of a proton from a conjugate acid, thereby forming a conjugate base, or by sharing a pair of electrons with the metal. There may be employed, for example, amino, alkylthio, hydroxy, carboxy, sulfonamido, or sulfamoyl. In a preferred embodiment, $G_1$ and $G_2$ independently represent hydroxy, carboxy, or a nitrogen atom which is part of $Z_1$ and $Z_2$.

Additional substituents which may be attached to $Z_1$ and $Z_2$ include, but are not limited to, substituents such as alkyl, aryl, acyl, alkoxy, halogen such as fluorine or chlorine, cyano, nitro, thioalkyl, solubilizing groups such as sulfonamido, sulfamoyl, carboxy, sulfo or hydrolyzable precursors thereof. Solubilizing groups are preferred so as to make the dye compatible with a given solvent system or polymer.

Where the terms "group" or "nucleus" are used in describing substituents, substitution is anticipated on the substituent. For example, "alkyl group" includes ether groups (e.g., $CH_3-CH_2-CH_2-O-CH_2-$), haloalkyls, nitroalkyls, carboxyalkyls, hydroxyalkyls, etc. while the term alkyl includes only hydrocarbons. Similarly, the term "arene nucleus" refers to not only phenyl, but chlorophenyl, ethylphenyl, and naphthyl as well. Substituents which react with active ingredients, such as very strong reducing or oxidizing substituents, would of course be excluded as not being inert or harmless.

The polymerization reaction of the inventive metaldyes may be carried out in the absence of other polymerizable monomers to form homopolymers or in the presence of other monomers to form copolymers. In the case of copolymers the metal-dye monomer to non-metal monomer ratio may be any number such that the desired effect of coloring the polymer is achieved. A preferred ratio of metal-dye polymer monomer to nonmetal monomer is in the range 1000000:1 to 1:100000. The monomers useful for copolymerization are restricted only in that they contain a group capable of undergoing a free-radically polymerizable reaction. Useful monomers include, but are not restricted to: ethylene, alkyl olefins, halogenated olefins, styrenes, 1,3-dienes, vinyl esters, vinyl ethers acrylates, methacrylates, acrylonitriles, methacrylonitriles, acrylamides, methacrylamides, N-vinylcarbazoles, and N-vinylpyrrolidones. The polymerization maybe initiated by a variety of methods well known in the polymer arts including: electrochemically, and photochemically. A preferred form of the invention has the comonomer as either an olefin or an acrylate, and the polymerization is initiated by standard free-radical methods such as those found in Odian, G. Principles of Polymerization, 2nd Ed.; John Wiley & Sons: New York, 1981; pp 194–223.

The following nonlimiting examples further illustrate the present invention.

Chemicals used in the examples are commercially available from Aldrich Chemical Company (Milwaukee, Wis.) or Reilly Tar and Chemical (Indianapolis, Ind.) unless otherwise specified. 4-Vinyl-4'-methyl-2,2'-bipyridyl was prepared according to the procedure of Abruna, H. A.; Breikss, A. I.; Collum, D. B. Inorg. Chem. 1985, 24, 988–9. 3-(3-pyridyl)propyl methacrylate was prepared according to the procedure of Deblauwe, V.; Smets, G. J. Polym. Sci., Part A 1989, 27, 671–80. The remaining azo dyes were prepared by standard procedures described in Brady, P. R.; Cookson, P. G.; Fincher, K. W.; Lewis, D. M. J. Soc. Dyers Colour. 1982, 98, 398–403. N,N-dibutyl-3-hydroxy-4-(5-hydroxy-3-methyl-1-phenyl-1H-pyrazol-4-yl)azo-1-naphthalenesulfonamide was prepared according to procedures described by Idelson, M.; Karady, I. R.; Mark, B. H.; Rickter, D. O.; Hooper, V. H. Inorg. Chem. 1967, 6, 450.

The polymerizable metal dye complexes and the polymeric derivatives were characterized by one or more of the following physical methods: UV-Visible spectroscopy, FT-IR spectroscopy, NMR spectroscopy, mass spectroscopy, laser desorption mass spectroscopy, elemental analysis and gel permeation chromatography. Melting points were determined using a Thomas-Hoover melting point apparatus or by differential scanning calorimetry at a heating rate of 10° C./min.

In the following examples, the particular dye synthesized is referred to by number (e.g., 1, 2, 3, etc.) and the corresponding structure for the numbered dyes are shown later herein.

EXAMPLE 1

This example describes the preparation of [[2,2'-azobis[phenolato]](-2)-N,O,O'](4-ethenylpyridine)-nickel (1).

2,2'-Dihydroxyazobenzene (1.0 g, 4.7 mmol), nickel-(II) chloride hexahydrate (1.0 g, 4.2 mmol), sodium ethoxide (0.60 g, 8.8 mmol) and ethanol (75 ml) were placed 125 ml Erlenmeyer flask. The mixture was stirred for 3 hrs. at room temperature at which time 4-vinylpyridine (1 ml, 9.3 mmol) was added. The resultant mixture was stirred overnight, whereupon dark needle-like crystals were isolated by filtration. The crystals were washed with ethanol (200 ml) to yield 1 which was purified by repeated recrystallization from dichloromethane/heptane; m.p.=162° C.; $\lambda_{max}$ (acetone)=508 nm ($\epsilon$=12,300$M^{-1}cm^{-1}$).

EXAMPLE 2

This example describes the preparation of preparation of [[2,2'-azobis[phenolato]](-2)-N,O,O'](4-ethenylpyridine)palladium (2).

A solution containing 2,2'-dihydroxyazobenzene (1.07 g, 5.0 mmol) in 50 ml dimethyl sulfoxide at 100° C. was added to a hot (100° C.) solution of potassium tetrachloropalladate (1.96 g, 6 mmol) in 50 ml dimethyl sulfoxide. After addition of potassium carbonate (2.00 g, 14.5 mmol) the mixture was heated to 150° C. for 10 min, then allowed to cool to 100° C. At this time, 4-vinylpyridine (1.0 ml, 9.3 mmol) was added. The solution was removed from the heat, placed on a magnetic stirrer, and allowed to stir overnight. The solution was filtered to remove excess potassium carbonate and some dark solids. The filtrate was diluted with $H_2O$ to induce precipitation. The solid was collected, dissolved in dichloromethane and dried with anhydrous magnesium sulfate. Methanol was added and the solvent volume further reduced to afford a crystalline solid; m.p.=184.5° C.; $\lambda_{max}$ (dichloromethane)=512 nm.

EXAMPLE 3

This example describes the preparation of [[2,2'-azobis[phenolato]](-2)-N,O,O'](4-ethenylpyridine)-platinum (3).

The procedure of Example 2 was used, except potassium tetrachloroplatinate (1.73 g, 4.2 mmol) was used in place of potassium tetrachloropalladate, and 2 ml vinylpyridine was added; m.p.=157.6° C.; $\lambda_{max}$ (dichloromethane)=480 nm.

EXAMPLE 4

This example describes the preparation of aqua[[2,2'-azobis[phenolato]](-2)-N,O,O'](2,4-pentanedionato-O,O')chromium (4).

In a 200 ml round bottom flask were placed 2,2'-dihydroxyazobenzene (4.28 g, 20.0 mmol), chromium(III) acetate monohydrate (19.94 g, 80.6 mmol), 2,4-pentanedione (20.6 ml, 200.0 mmol), and 80 ml dimethyl formamide. This dark yellow-green reaction mixture was refluxed with stirring for 1 hr. The resultant deep red-purple solution was cooled to 25° C. and then poured into 400 ml distilled water containing several drops of concentrated sulfuric acid. The resulting red-purple solid was collected by filtration, washed several times with distilled water and then dried in a vacuum oven at about 40° C. To the crude reaction product was added about 300 ml acetone, and the acetone was reduced in volume to about 125 ml by distillation. The solution was cooled to 25° C. followed by cooling to 0° C. to afford 4.15 g (54% yield) of 4 which was recrystallized from a mixture of hot acetone/methanol/toluene (5:1:1); $\lambda_{max}$ (methanol)=540, 514, 440 nm.

EXAMPLE 5

This example describes the preparation of aqua[2-[[(4,6-dimethoxy-2-hydroxyphenyl)imino]methyl]-4-nitrophenolato-N,O,O'](2,4-pentanedionato-O,O')-chromium ($H_2O$) (5).

Compound 5 was prepared using procedures described in U.S. Pat. No. 3,597,200. In a 250 ml two-neck flask equipped with a Dean-Stark trap and reflux condenser were placed chromium(III) chloride hexahydrate (4.00 g, 0.015 mol), 40 ml dimethyl formamide, and 50 ml toluene. The contents of the flask were heated with separation of water as a toluene/water azeotrope. Next, 100 ml isopropanol was added followed by heating to remove the toluene as a isopropanol/toluene azeotrope. After approximately 150 ml distillate was collected, the flask was cooled and 2-hydroxy-4,6-dimethoxybenzald(2'-hydroxy-5'-nitrophenyl)imine (4.77 g, 0.015 mol) was added. The reaction mixture was then heated at 90° C. for 15 hr. The solution was cooled to 60° C. and 2,4-pentanedione (1.54 ml, 0.015 mol) and tri-n-butylamine (3.57 ml, 0.015 mol) were added and heating was continued for another 2.5 hr. The mixture was cooled and then poured into a total of 800 ml distilled water containing several drops concentrated hydrochloric acid. The resulting yellow-brown solid was dried in vacuo to afford 4.78 g of 5 (58% yield); $\lambda_{max}$ (methanol)=460, 435, 405, 380, 328, 321, 309 nm.

EXAMPLE 6

This example describes the preparation of [[2,2'-azobis[phenolato]](-2)-N,O,O'](4-ethenylpyridine)(2,4-pentanedionato-O,O')chromium (6).

In a 100 ml round bottom flask were placed compound 4 (1.14 g, 3.0 mmol), and 70 ml dichloromethane. To this stirred solution was added 4-vinylpyridine (1.61 ml, 15.0 mmol). The progress of the reaction could be conveniently followed by thin layer chromatography on silica gel using an eluent mixture of 75% dichloromethane, 20% hexane, and 5% acetone. After stirring for 4 hr the reaction solvent was removed under vacuum to afford a dark red-purple oil. This oil was triturated by adding several portions of hexane and scraping the sides of the flask. The resulting brown solid was collected by filtration and dried under vacuum to afford 1.08 g (77% yield) of compound 6. An analytical sample, containing one-half mole of dichloromethane solvate, was obtained by several recrystallizations from hot dichloromethane/hexane; m.p. 195° C.; $\lambda_{max}$ (methanol)=550, 525, 450 nm.

EXAMPLE 7

This example describes the preparation of [[2,2'-azobis[phenolato]](-2)-N,O,O'](2,4-pentanedionato-O,O')[3-(3-pyridinyl)propyl 2-methyl-2-propenoate-N]chromium (7).

In a 100 ml round bottom flask were placed compound 4 (0.500 g, 1.31 mmol), followed by 40 ml dichloromethane. To this stirred solution was added 3-(3-pyridyl)propyl methacrylate (1.35 g, 6.6 mmol) and stirring was continued at 25° C. for 5.5 hr. The solvent was removed under vacuum to afford a dark purple oil. This oil was triturated to a red-purple oily solid by the addition of several portions of hexane with vigorous scraping. An analytical sample was obtained by several recrystallizations from cold dichloromethane/heptane; m.p. 84° C.

EXAMPLE 8

This example describes the preparation of [6-[[(2-hydroxy-5-nitrophenyl)imino]methyl]-3,5-dimethoxyphenolato-N,O,O'[(4-ethenylpyridine)(2,4-pentanedionato-O,O')chromium (8).

In a 50 ml round bottom flask were placed compound 5 (0.666 g, 1.4 mmol), followed by 25 ml dichloromethane. To this solution was added 4-vinylpyridine (0.74 ml, 6.8 mmol), with continued stirring for 12 hr. The progress of this reaction was conveniently followed by thin layer chromatography. The reaction solvent was then removed under vacuum and the resulting residue washed with two portions of petroleum ether. Drying the sample under vacuum afforded 0.776 g (98% yield) of compound 8 as a red-brown solid which was recrystallized from dichloromethane/hexane; m.p. 230° C. (dec); $\lambda_{max}$ (methanol): 439 nm ($\epsilon=14,100M^{-1}cm^{-1}$), 405 nm ($\epsilon=14,700M^{-1}cm^{-1}$), 381 nm ($\epsilon=14,600M^{-1}cm^{-1}$), 323 nm ($\epsilon=14,600M^{-1}cm^{-1}$).

EXAMPLE 9

This example describes the preparation of [[2,2'-azobis[phenolato]](-2)-N,O,O'](1-ethenyl-1H-imidazole-$N^3$)nickel (9).

In a 250 ml Erlenmeyer flask were placed 2,2'-dihydroxyazobenzene (2.0 g, 9.4 mmol), nickel(II) chloride hexahydrate (2.0 g, 8.4 mmol), sodium ethoxide (1.2 g, 17.6 mmol) and ethanol (150 ml). The solution was stirred for 4 hr and 1-vinylimidazole (2.08 g, 22 mmol) was added. The reaction mixture was stirred overnight where upon a dark crystalline material formed. The solid was purified by repeated recrystallization from dichloromethane/methanol; m.p. 182° C.; $\lambda_{max}$ (dichloromethane): 507 nm.

EXAMPLE 10

This example describes the preparation of (1-ethenyl-1H-imidazole-$N^3$)[1-[(2-hydroxy-4-methylphenyl)azo]-2-naphthalenolato(-2)]nickel (10).

Compound 10 was prepared as in Example 9, except 1-[(2-hydroxy-4-methylphenyl)azo]-2-naphthol (2.0 g, 7.2 mmol), was used in place of 2,2'-dihydroxyazobenzene; m.p. 162° C.; $\lambda_{max}$ (dichloromethane): 538 nm.

EXAMPLE 11

This example describes the preparation of (4-ethenylpyridine)[1-[(2-hydroxyphenyl)azo]-2-naphthalenolato(-2)]nickel (11).

Compound 11 was prepared as in Example 1, except 1-[(2-hydroxyphenyl)azo]-2-naphthol (1.0 g, 3.8 mmol) was used in place of 2,2'-dihydroazobenzene; m.p. 186° C.; $\lambda_{max}$ (acetone): 536 nm ($\epsilon = 19,200 M^{-1} cm^{-1}$).

EXAMPLE 12

This example describes the preparation of [1-[(5-chloro-2-hydroxyphenyl)azo]-2-naphthalenolato(-2)](4-ethenylpyridine)nickel (12).

Compound 12 was prepared as in Example 1, except 1-[(2-hydroxy-5-chlorophenyl)azo]-2-naphthol was used in place of 2,2'-dihydroxy-azobenzene, m.p. 253° C.; $\lambda_{max}$ (acetone): 545 nm ($\epsilon = 18,500 M^{-1} cm^{-1}$).

EXAMPLE 13

This example describes the preparation of [2,4-dihydro-4-[(2-hydroxyphenyl)azo]-5-methyl-2-phenyl-3H-pyrazol-3-onato(-2)](4-ethenylpyridine)nickel (13).

A 125 ml Erlenmeyer flask was charged with 1-phenyl-3-methyl-4-[(2-hydroxyphenyl)azo]-5-pyrazolone (1.0 g 3.4 mmol) and 33 ml dimethyl sulfoxide. This mixture was heated with stirring to 50° C. for 0.5 hour, the undissolved solids (0.05 g) were removed by filtration. Nickel(II) acetate tetrahydrate (1.0 g, 4.0 mmol) was added to the filtered solution and the mixture reheated to 50° C. with stirring for an additional 0.5 hour. 4-vinylpyridine (0.98 g, 9.3 mmol) was added and the mixture was stirred without heating for 2.0 hr. Water was added to induce precipitation. The solid was collected by filtration, extracted with dichloromethane, dried over anhydrous magnesium sulfate. After filtering the magnesium sulfate off, heptane was added and the solvent volume reduced by evaporation on a hot plate. Dark crystals with green reflex were recovered (0.62 g). A second crop, not weighed could be subsequently isolated. Repeated crystallization from dichloromethane/heptane resulted in analytically pure material. m.p. 228° C.; $\lambda_{max}$ (acetone): 453 nm ($\epsilon = 17,600 M^{-1} cm^{-1}$).

EXAMPLE 14

This example describes the preparation of [[2,2'-azobis[phenolato]](-2)-N,O,O'](2-ethenylpyridine)nickel (14).

Compound 14 was prepared as in Example 1, except 2-vinylpyridine was used in place of 4-vinylpyridine; $\lambda_{max}$ (dichloromethane): 509 nm.

EXAMPLE 15

This example describes the preparation of [[2,2'-azobis[phenolato]](-2)-N,O,O'](4'-ethenyl-4-methyl[2,2'-bipyridine]-N,N')nickel (15).

In a 125 Erlenmeyer flask were placed 2,2'-dihydroxyazobenzene (0.56 g, 2.6 mmol), nickel(II) acetate tetrahydrate (0.56 g, 2.3 mmol), sodium ethoxide (0.35, 5.1 mmol), and 75 ml ethanol. The mixture was heated to 50° C. with stirring for 1.0 hour. The solution was filtered to remove any solids, then 4-vinyl-4'-methylbipyridyl (0.53 g, 2.8 mmol) was added. A red-brown microcrystalline solid was immediately formed; stirring was continued overnight. The solid was collected by filtration and dried in a vacuum oven at room temperature. The solid was recrystallized from hot dichloromethane; $\lambda_{max}$ (dichloromethane): 491 nm.

EXAMPLE 16

This example describes the preparation of aqua[4-[(N,N-dibutylaminosulfonyl-2-hydroxy-1-naphthalenyl)azo]-2,4-dihydro-5-methyl-2-phenyl-3H-pyrazol-3-onato(-2)](2,4-pentanedionato-O,O')chromium (16).

In a 200 ml round bottom flask were placed N,N-dibutyl-3-hydroxy-4-(5-hydroxy-3-methyl-1-phenyl-1H-pyrazol-4-yl)azo-1-naphthalenesulfonamide (5.36 g, 10.0 mmol), chromium(III) chloride hexahydrate (3.46 g, 13.0 mmol), and 50 ml of dimethyl forman-iide. The reaction mixture was then heated at 130° C. for 3 hr. The resulting magenta reaction mixture was cooled to 95° C. and 2,4-pentanedione (1.54 ml, 15.0 mmol) and tri-n-butylamine (3.57 ml, 15.0 mmol) were added. After sniffing at this temperature for 1.5 hr the reaction mixture was cooled to 25° C. and poured into 300 ml of distilled water containing several drops of conc. hydrochloric acid. The product was collected by vacuum filtration, washed extensively with distilled water, and dried under vacuum to afford 7.20 g (100% yield) of 16; $\lambda_{max}$, (methanol) = 557,522 nm.

EXAMPLE 17

This example describes the preparation of chromium(1-phenyl3-methyl-4[(2-oxy-4-N,N-dibutylsulfonamidonaphthyl)azo]-5-pyrazolonate)-(acetylacetonate)(4-vinylpyridine) (17).

In a 100 ml round bottom flask were placed compound 16 (1.02 g, 1.3 mmol) and 50 ml of dichloromethane. To this stirred solution was added 4-vinylpyridine (0.43 ml, 4.0 mmol). After stirring for 24 hr the solvent was removed under vacuum to afford a magenta gum. The gum was triturated by adding several portions of hexane and scraping the sides of the flask. The resulting solid was collected by vacuum filtration and dried under vacuum to afford 1.12 g (100% yield) of compound 17. The sample was recrystallized from a mixture of toluene, dichloromethane, and heptane to give magenta crystals; m.p. 167° C.; $\lambda_{max}$, (methanol) = 568, 532 nm.

EXAMPLE 18

This example describes the preparation of palladium(1-phenyl-3-methyl-4-[(2-oxyphenyl)azo]-5-pyrazolonate)(4-vinylpyridine) (18).

In a 250 ml Erlenmeyer flask were placed 1-phenyl-3-methyl-4-[(2-hydroxyphenyl)azol-5-pyrazolone (1.47 g, 5.0 mmol) and 40 ml of dimethyl sulfoxide. The solution was heated to 100° C. and to this was added a hot (100° C.) solution of potassium tetrachloropalladate (1.96 g, 5.0 mmol) in 50 ml of dimethyl sulfoxide. After the addition was complete anhydrous potassium carbonate (2.00 g, 14.5 mmol) was added with continued stirring. The solution was then heated to 150° C. for 10 min and then cooled to 100° C. whereupon 4-vinylpyridine (1.00 ml, 9.3 mmol) was added in one portion. The solution was cooled to 25° C. and allowed to stir at this temperature for overnight. The reaction mixture was poured into 250 ml of distilled water and the resulting orange-brown precipitate collected by vacuum filtration. The solid was then dissolved in 400 ml of dichloromethane and treated with dry anhydrous magnesium sulfate. The solution was then filtered and the solvent removed under vacuum to give a deep-orange solid; $\lambda_{max}$ (chloroform) = 475 nm.

EXAMPLE 19

This example describes the preparation of nickel(2,2'-dioxyazobenzene)(poly(methyl methacrylate)-poly(4-vinylpyridine) copolymer) (19).

1.0 g Nickel(2,2'-dioxyazobenzene)(4-vinylpyridine), 5.0 g methylmethacrylate, 100 mg 2,2'-azobisisobutyronitrile, and 30 ml toluene were placed in a 100 ml three-necked round bottom flask equipped with a condenser, a nitrogen inlet tube, and a thermometer. The system was purged with dry nitrogen and then heated to 70° C.; the temperature was maintained at 70° C. with a thermowatch apparatus. After 18 hr, the reaction mixture was cooled and precipitated with ethanol. The polymer was collected, redissolved in toluene, filtered and reprecipitated with ethanol. The solid was collected and dried overnight in vacuo at 50° C.; $\lambda_{max}$ (acetone): 508 nm; $\lambda_{max}$ (toluene): 512 nm; $M_w = 17,000$ Daltons.

EXAMPLE 20

This example describes the preparation of nickel(1-[(2-oxyphenyl)azo]-2-naphtholate)(poly(methyl methacrylate)-poly(4-vinylpyridine) copolymer) (20).

The procedure of Example 19 was followed, except 1.0 g nickel(1-[(2-oxyphenyl)azo]-2-naphtholate)(4-vinylpyridine) was copolymerized with methyl methacrylate; $\lambda_{max}$ (acetone): 536 nm; $M_w = 22,500$ Daltons.

EXAMPLE 21

Nickel(1-[(2-oxy-5-chlorophenyl)azo]-2-naphtholate)(poly(methyl methacrylate)-poly(4-vinylpyridine) copolymer) (21) was prepared according to the procedure of Example 19 using 12; $\lambda_{max}$ (acetone): 545 nm; $M_w = 25,000$ Daltons.

EXAMPLE 22

Nickel(1-phenyl-3-methyl-4-[(2-oxyphenyl)azo]-5-pyrazolonate)(poly(methyl methacrylate)-poly(4-vinylpyridine) copolymer) (22) was prepared from 13 according to the method of Example 19; $\lambda_{max}$ (acetone): 459 nm; $M_w = 23,500$ Daltons.

EXAMPLE 23

Chromium(2-oxy-4,6-dimethoxybenzald(2'-oxy-5'-nitro)imine)(acetylacetonate)(poly(methyl methacrylate)-poly(4-vinylpyridine) copolymer) (23) was prepared from 8 according to the procedure of Example 19.

In a 100 ml two-necked flask equipped with a gas-inlet valve was placed monomer 8 (0.25 g) followed by 15 ml anhydrous, oxygen-free toluene. To this solution was added recrystallized 2,2'-azobis(isobutylnitrile) (25 mg) and methyl methacrylate (1.31 g), which had been purified by passage through DE-HIBIT-100 (Polysciences, Inc.). The flask was sealed with a condenser and gas-outlet valve, and then purged with nitrogen. The system was heated to 74° C. and maintained at this temperature for 19 hr. After cooling, the polymer was precipitated with methanol, and then collected by vacuum filtration. The resulting yellow-brown polymer was dissolved in chloroform, reprecipitated with methanol, and dried under vacuum; $\lambda_{max}$ (chloroform) = 483, 458, 418, 333 nm; $M_w = 24,900$, $M_n = 12,800$.

Structural Formulae

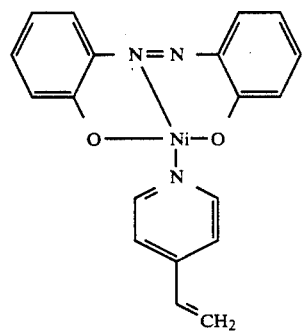

1

-continued
Structural Formulae
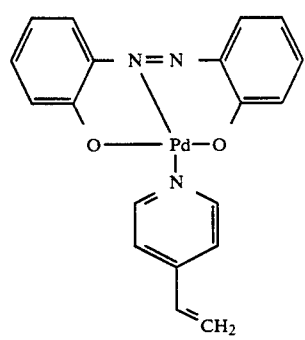
2
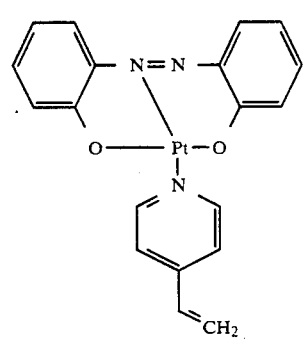
3
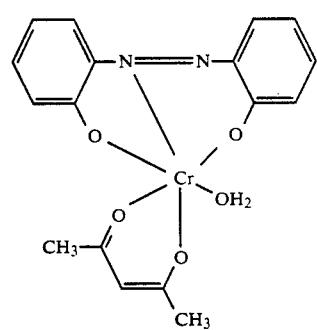
4
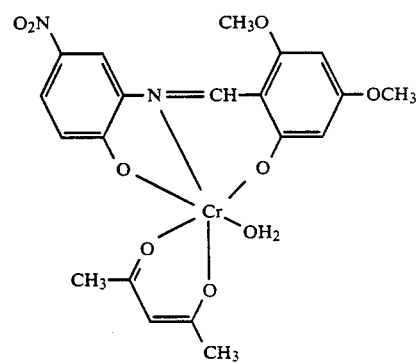
5

Structural Formulae
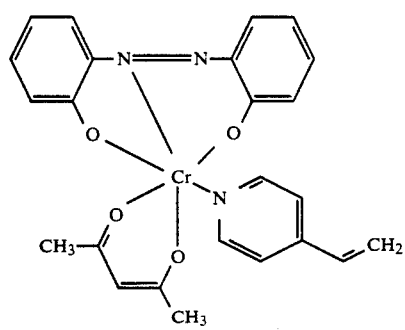
6
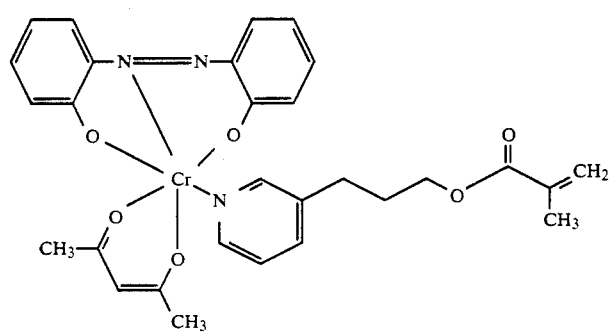
7
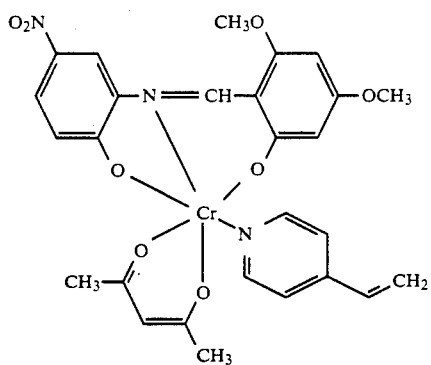
8
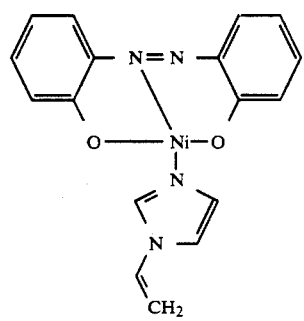
9

Structural Formulae
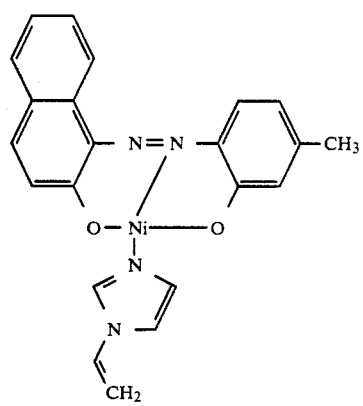
10
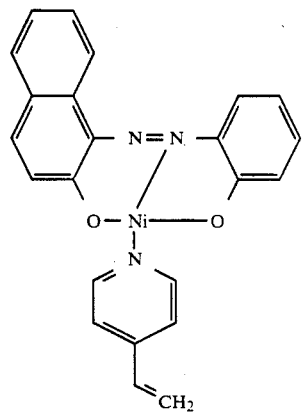
11
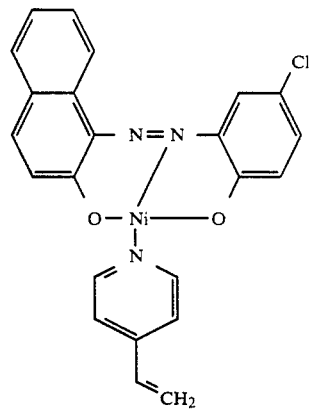
12
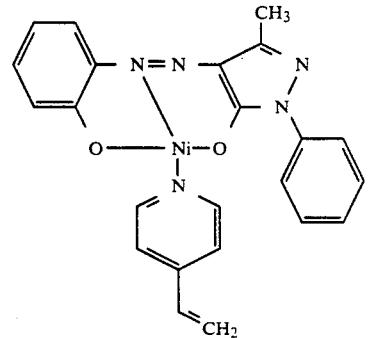
13

Structural Formulae
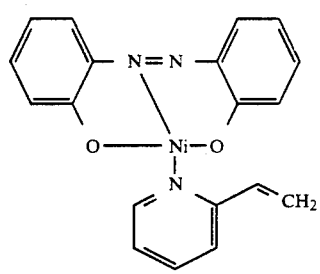
14
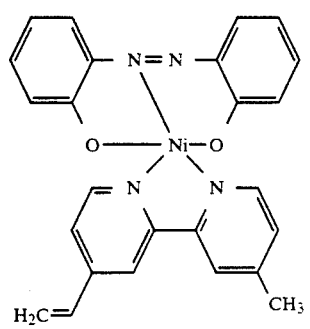
15
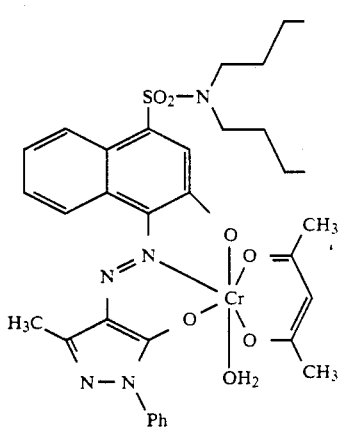
16
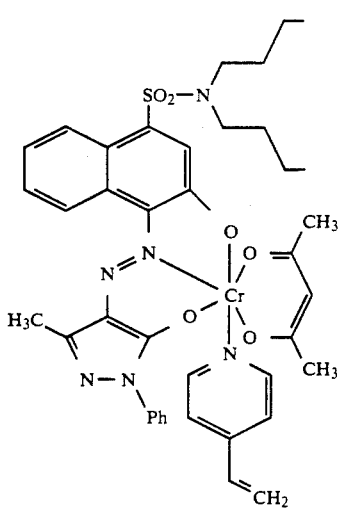
17

Structural Formulae
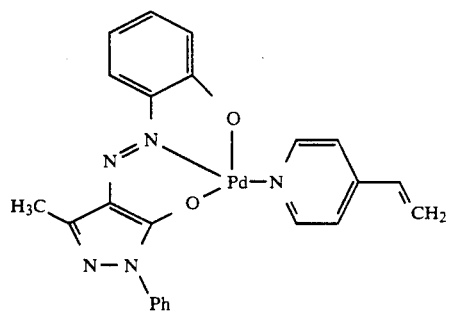
18
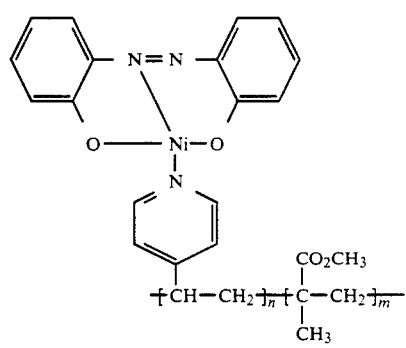
19
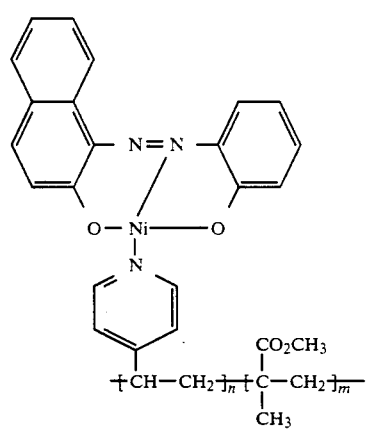
20
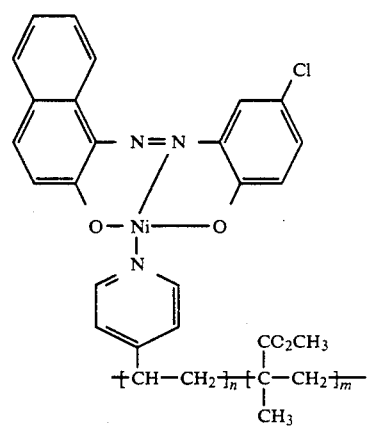
21

Structural Formulae

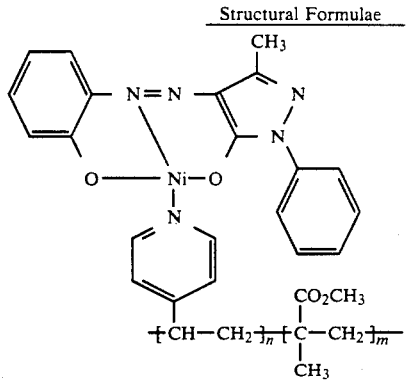

22

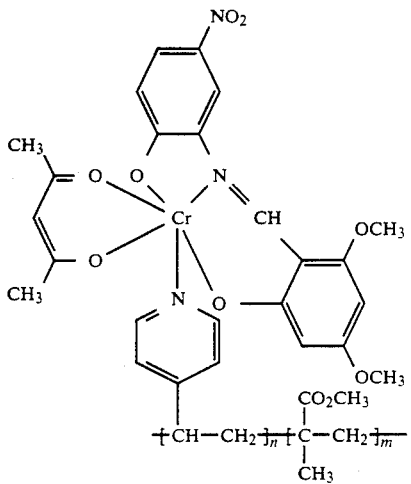

23

We claim:
1. A polymerizable metal-azo or metal-azomethine dye, of the formula:

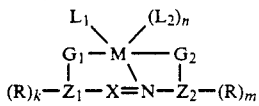

wherein:
$Z_1$ and $Z_2$ each independently represents an arene nucleus, with from 5 to 14 ring atoms each;
$G_1$ and $G_2$ each independently represent a metal ligating group and further wherein $G_1$ and $G_2$ may be contained within or pendant from at least one of $Z_1$ and $Z_2$;
R represents a hydrogen atom, a halogen atom, an alkyl group, an acylamino group, an alkoxy group, a sulfonamido group, an aryl group, a thiol group, an alkylthio group, an arylthio group, an alkylamino group, an arylamino group, an amino group, an alkoxycarbonyl group, an acyloxy group, a nitro group, a cyano group, a sulfonyl group, a sulfoxyl group, an aryloxy group, a hydroxy group, a thioamido group, a carbamoyl group, a sulfamoyl group, a carboxyl group, a sulfo group, a formyl group, an acyl group, a ureido group, or aryloxycarbonyl group, a silyl group, a carbonato group, or a sulfoalkoxy group;
$L_1$ represents any 1°, 2°, or 3° nitrogen or 1°, 2°, or 3° phosphorus containing a vinyl group;
$L_2$ represents a monodentate or polydentate ligand;
X represents a nitrogen atom or a methine group;
M is a divalent or polyvalent transition metal ion where the coordination number is at least four; and
k, m, and n are whole numbers less than or equal to 3.

2. A polymerizable metal-azo or metal-azomethine dye according to claim 1 where $Z_1$ and $Z_2$ represent a heterocyclic or substituted heterocyclic nucleus or a carbocyclic or substituted carbocyclic aromatic nucleus.

3. A polymerizable metal-azo or metal-azomethine dye according to claim 1 wherein at least one of $Z_1$ and $Z_2$ are arene nuclei containing only carbon.

4. A polymerizable metal-azo or metal-azomethine dye according to claim 1, wherein $G_1$ and G are individually selected from the group consisting of oxygen, sulfur, amines, substituted amines, acylamido, and sulfonamido.

5. A polymerizable metal-azo or metal-azomethine dye according to claim 1 wherein at least one of $G_1$ and $G_2$ is an oxygen atom.

6. A polymerizable metal-azo or metal-azomethine dye according to claim 1 wherein $L_1$ is a vinylpyridine.

7. A polymerizable metal-azo or metal-azomethine dye according to claim 1 wherein $L_1$ is 1-vinylimidazole.

8. A polymerizable metal-azo or metal-azomethine dye according to claim 1 wherein $L_1$ is 4-vinyl-4'-methyl bipyridyl.

9. A polymerizable metal-azo or metal-azomethine dye according to claim 1 wherein $L_1$ consists of a pyridine containing ligand which also contains a vinyl or an acrylate group.

10. A polymerizable metal-azo or metal-azomethine dye according to claim 1 wherein $L_1$ is 4-vinylpyridine.

11. A polymerizable metal-azo or metal-azomethine dye according to claim 1 wherein M is selected from the group of chromium(III), nickel(II), palladium(II), and platinum(II).

12. A polymerizable metal-azo or metal-azo-methine dye according to claim 1 wherein M is chromium.

* * * * *

UNITED STATES PATENT AND TRADEMARK OFFICE
CERTIFICATE OF CORRECTION

PATENT NO. : 5,166,326

DATED : November 24, 1992

INVENTOR(S) : Terrance P. Smith, David W. Macomber, and Mohammed A. Elmasry

It is certified that error appears in the above-identified patent and that said Letters Patent is hereby corrected as shown below:

Title page, Item [75] under Inventor the name "Malcomber" should be
--Macomber--.

Title page, Item [75] under Inventor the name "Elmastry" should be
--Elmasry--.

Signed and Sealed this

Fifth Day of October, 1993

Attest:

BRUCE LEHMAN

*Attesting Officer*  *Commissioner of Patents and Trademarks*